Sept. 15, 1970        S. SAAL        3,528,259
COMBINATION CLEANING AND SUPPORTING RACK
Filed Sept. 18, 1967
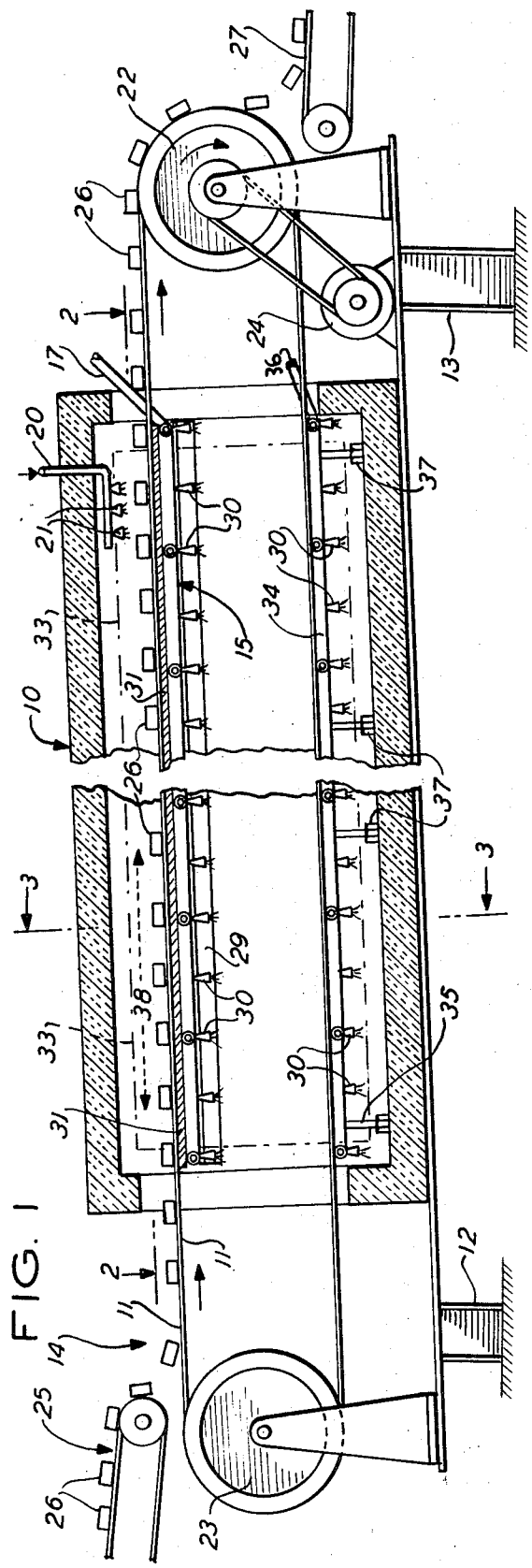
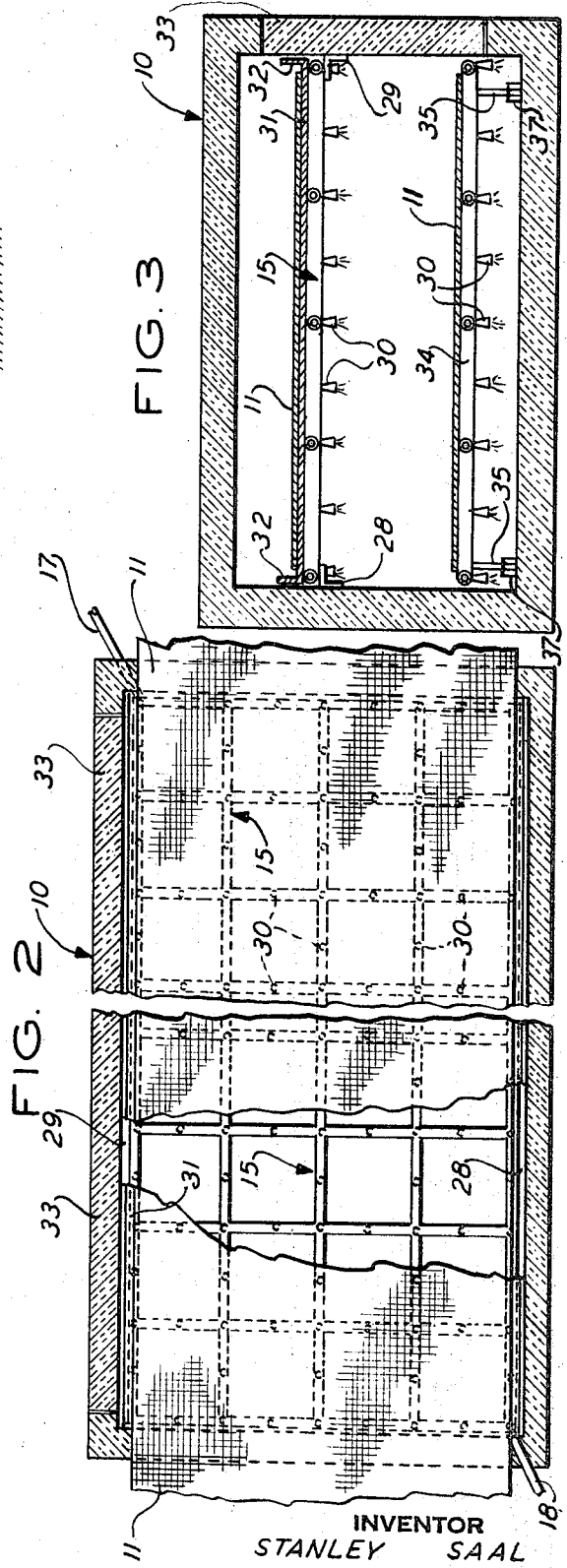
INVENTOR
STANLEY SAAL
BY F.B. Henry
ATTORNEY

United States Patent Office 3,528,259
Patented Sept. 15, 1970

3,528,259
COMBINATION CLEANING AND SUPPORTING RACK
Stanley Saal, Elizabeth, N.J., assignor to Air Reduction Company, Incorporated, New York, N.Y., a corporation of New York
Filed Sept. 18, 1967, Ser. No. 668,475
Int. Cl. B08b 9/08; F25d 3/10
U.S. Cl. 62—303                    11 Claims

ABSTRACT OF THE DISCLOSURE

This invention relates to an apparatus for cleaning liquid nitrogen refrigerated food freezing equipment. More specifically, the support structure of the equipment is also used as a means to deliver a cleaning fluid to the interior surfaces of the equipment, particularly those surfaces that are normally inaccessible or extremely difficult to reach.

BACKGROUND OF THE INVENTION

The food processing industry is well aware of the need for good sanitation practice and procedures. Generally, good practice and/or legal requirements demand that most equipment be thoroughly cleaned after the completion of each food processing cycle. Also, certain types of foods such as meats, fish and poultry require extraordinary sanitation procedures. Thermodynamic design requirements of new cryogenic freezing equipment has made it more difficult and expensive to maintain the proper sanitation standards.

With most food processing equipment the cleaning provedure consisted simply of flushing a cleaning fluid, such as hot water or steam, over the surfaces of the equipment in order to remove all the unsanitary food particles. This was accomplished by using a hose, etc. and by manually manipulating the hose to direct the cleaning fluid or steam over the surfaces to be cleaned. As equipment became larger and more complex, the cleaning process became more difficult in that many areas of the machine became impossible to reach with the hose. The equipment could be constructed for disassembly for cleaning, but this greatly increases the cost of equipment. Furthermore, the general characteristics and the thermodynamic design requirements of recently developed liquid nitrogen refrigerated food freezing equipment makes disassembly difficult.

Liquid nitrogen refrigerated food freezing equipment generally comprises an insulated tunnel which contains a food carrying conveyor that passes through a liquid nitrogen spray. The dimensions of that tunnel are mainly dependent upon the capacity and type food to be frozen. A more detailed description of the equipment and its operation can be obtained by reading Pat. No. 3,298,188 issued to R. C. Webster and J. S. Hinn. Thermodynamic efficiency requires that both the upper and lower loop of the conveyor belt bet at least partially contained within the tunnel which consequently increases the sanitation problem because loose food particles eventually fall from the bottom return loop and remain in the tunnel. Also, the required use of an open mesh conveyor belt allows loose food particles to fall through the upper loop.

Prior to this invention the tunnels were constructed with various doors through which the tunnels were cleaned manually. This resulted in increased fabrication cost and operating expenses. Recently designed tunnels have several side doors which provide a means for removing trays located under the conveyor belt and for making repairs and adjustments. The side doors also provide a means for cleaning manually the inner surface of the tunnel. It is the purpose of this invention to substantionally eliminate the need for the above-mentioned manual cleaning. The invention provides for an automatic means to easily and thoroughly clean the equipment.

SUMMARY OF THE INVENTION

This invention relates to an apparatus that provides a means for thoroughly cleaning the inner surface of food freezing equipment which uses a liquified gas, such as nitrogen, for a refrigerant. The invention comprises the use of the inner structural support racks for the upper and lower conveyor belts to deliver a cleaning fluid to the inner surfaces of equipment.

The upper and lower conveyor belt supporting racks are made of pipe-like material of sufficient strength to support the conveyor belt within the tunnel and also provides a means of delivering cleaning fluid. The hollow support racks are so sized and equipped with a plurality of outlets that the inaccessible and difficult to reach surfaces are thoroughly cleaned when a cleaning fluid is injected into the support racks. The supporting racks, either separately or as a system, are equipped with drains located at the low point so that the racks may be drained. The racks are inclined to drain dry so as to prevent freezing when the equipment is again operated.

The object of this invention is to provide a means of delivering a cleaning fluid to inner surfaces of liquid nitrogen refrigerated food freezing equipment that are inaccessible or difficult to reach.

It is a further object of this invention to utilize the existing conveyor belt support racks as a means for delivering a cleaning fluid.

It is a further object of the invention to provide a simplified mounting for the support racks so that they can be removed from the tunnel.

Other features, objects and advantages will appear from the following more detailed description of an illustrative embodiment of the invention.

BRIEF DESCRIPTION OF THE DRAWING

FIG. 1 represents a schematic illustration, partly broken away, of an elevational cross-sectional view of an elongated freezing tunnel.

FIG. 2 represents a plan view of the tunnel taken generally along section 2—2 of FIG. 1.

FIG. 3 represents a transverse cross-sectional view of the tunnel taken along lines 3—3 of FIG. 1.

In FIG. 1, there is illustrated an elongated freezing tunnel 10 which is supported on the ground by means of supports 12, 13. As shown, the tunnel is inclined in order that the nitrogen vapor which is evolved in the tunnel flows toward the infeed end 14. A more complete discussion of this may be found in the above-mentioned U.S. Pat. No. 3,298,188. The tunnel is constructed generally of sheet metal and has a layer of insulating material between the layers of sheet metal.

Liquid nitrogen is introduced into a spray header 20 on which is mounted a plurality of spray nozzles 21. The liquid nitrogen is sprayed downwardly in order to contact the food articles, etc., which are to be frozen.

The articles to be frozen are brought to the tunnel by means of a conveyor 25, hopper etc., and are placed on the belt 11 at the infeed end 14. The belt is normally made of stainless steel mesh. As shown the belt extends between a drive wheel 22 and an idler wheel 23. The drive wheel is driven in the direction by any suitable power means 24. The articles may drop from the belt onto an unloading belt 27 or into a receptacle, as desired.

The belt 11 is supported in the upper portion of the tunnel by means of a tubular framework 15 which is in turn slidably mounted on a pair of angle irons 28, 29. The said framework extends substantially the entire length of the tunnel and may be pulled out of the tunnel in a lengthwise direction for repair, etc. The framework consists of a series of longitudinal sections of tubing which are interconnected by means of transverse sections of tubing. The tubing is connected by brazing or any other suitable means so that there is fluid communication between all sections. A plurality of spray nozzles 30 are attached to the underside of the framework so that fluid may be sprayed in a downward direction. The nozzles are threaded and then screwed into the framework. Each nozzle contains an orifice which is large enough to allow all the fluid to drip out when the cleaning process is complete. Certain nozzles may be directed angularly so that the side walls of the tunnel are cleaned. Most of the nozzles are directed downwardly so that the spray is directed onto the lower run of the belt 11.

An elongated tray 31 is positioned on the tubular framework and directly supports the underside of the upper run of belt 11. It has been found that this tray greatly assists in vaporizing the liquid nitrogen. Part of the liquid nitrogen which has been directed downwardly from nozzles 21 misses the food articles and strikes the tray and thereupon flashes. The elongated tray has upturned edges 32 which assist in retaining the nitrogen liquid and vapor in the upper part of the tunnel. For purposes of easy removal, the tray 31 may be made from a number of pieces of sheet metal which may be removed through side doors in the tunnel (shown schematically in FIG. 1).

The tubular framework 15 may be supplied with any suitable cleaning fluid through an inlet connection 17. A steam hose may be coupled with this connection to allow steam to be forced into the framework for distribution throughout the tunnel. It has been found best to force the cleaning fluid into the system under pressure (for example, 30–70 p.s.i.g.) in that this enhances the cleaning action of the fluid. The nozzles 30 will direct the fluid downwardly onto the lower run of the belt and onto the sides of the tunnel to clean the same. Due to the angle of inclination of the tunnel, the cleaning fluid along with the dislodged dirt will flow out of the tunnel.

The lower run of the belt 11 may also be supported by a tubular framework 34 which is constructed in the same manner as the upper framework. The lower framework may rest on angle irons attached to the side of the tunnel or they may rest on adjustable studs 35 as shown. The lower framework may be also removed from the tunnel in that the adjustable nuts 37 merely rest on the bottom of the tunnel. The lower framework also has nozzles 30 which direct the cleaning fluid downwardly or toward the sides of the tunnel. An inlet connection 36 is provided so that fluid may be forced into the lower framework. When the cleaning operation is completed, cleaning fluid will drain from the framework. Each tubular framework is provided with a nozzle or orifices at its lowermost point so that all fluid will drain therefrom. The operation of the tunnel may be described as follows. Food or other articles to be frozen are dropped or placed on the belt 11 and are then carried into the tunnel. Since the nitrogen gas is moving downwardly in the tunnel the articles are precooled in the portion of the tunnel designated by reference numeral 38. The articles then come under the liquid nitrogen where they are usually completely frozen. The articles are then carried out of the tunnel and are dropped onto a conveyor 27 or into a receptacle. Particles of food or of the articles being frozen often adhere to the mesh conveyor 11. When the conveyor comes back into the tunnel on its lower run the particles often drop off and stick or accumulate in the bottom of the tunnel thereby creating an unsanitary condition. Heretofore there has been no quick and economical method of cleaning the inside of the tunnel and the mesh conveyor.

When the freezing operation has been completed the tunnel is allowed to stand for a few minutes to allow the remaining nitrogen vapor to flow out of the tunnel.

A source of cleaning fluid (steam, water, chlorine solution, etc.) is then connected to the upper 15 and lower 34 frameworks and the fluid is forced through the frameworks under pressure. The nozzles 30 spray the fluid onto the lower run of the belt and onto the sides and the bottom of the tunnel. The cleaning fluid spray dislodges dirt, food particles, and other undesirable matter from the conveyor and tunnel and the solution runs down the bottom of the tunnel toward and out of the inlet end. During the cleaning process the conveyor belt is continuously run through the tunnel so that all parts of the belt are exposed to the cleaning fluid spray.

It has been found that it is not always necessary to direct the cleaning fluid into both the upper and lower frameworks. Quite often the fluid spray from the upper framework is sufficient to clean the tunnel and it is not therefore necessary to pressurize the lower framework. If, however, the tunnel and belt is especially dirty, both frameworks should be pressurized. After the cleaning operation is completed, the frameworks should be allowed to stand until they drain of all excess cleaning fluid. The freezing operation should not commence until all cleaning fluid is drained from the tunnel. This delay is necessary to prevent the cleaning fluid from freezing in the framework.

The tunnel described above has been found especially suited for freezing food but could be used for freezing other articles. Furthermore, a tunnel with the supporting and cleaning mechanism described above could be used for other processes, for example thermal treatment, sand blasting, painting, etc. It is also possible to use the supporting and cleaning mechanism in connection with a conveyor system which is not at least partially in a tunnel. For example, the conveyor system might be located in a room and not be at least partially surrounded by a tunnel.

The invention has been described in its preferred embodiments, but changes and modifications can be made, and some features can be used in different combinations without departing from the invention as defined in the claims.

What is claimed is:

1. In a freezing tunnel, means for conveying articles to be frozen through said tunnel, means for contacting the articles to be frozen with cryogenic liquid, said conveying means having an upper run and a lower run each at least partially housed in said tunnel, support means in said tunnel for said conveying means, said support means being partially hollow and having a plurality of outlets to distribute cleaning fluid to the interior surfaces of said tunnel, said support means having an inlet connection through which the cleaning fluid is supplied, and means to insure the drainage of cleaning fluid from the support means so that no cleaning fluid remains in said support means upon the conclusion of cleaning.

2. A freezing tunnel as defined in claim 1 in which the support means comprises at least one tubular framework.

3. A freezing tunnel as defined in claim 2 in which the conveying means comprises an endless belt.

4. A freezing tunnel as defined in claim 3 in which said tubular framework at least partially supports the upper run of said endless belt.

5. A freezing tunnel as defined in claim 4 in which said outlets in said framework are at least partially directed toward the lower run of said belt.

6. A freezing tunnel as defined in claim 1 in which the tunnel is inclined downwardly toward the infeed end.

7. A freezing tunnel as defined in claim 5 in which a second tubular framework at least partially supports the lower run of said belt, said second tubular framework having downwardly directed outlets.

8. A freezing tunnel as defined in claim 7 in which said second tubular framework is adjustably positioned in said tunnel.

9. A freezing tunnel as defined in claim 4 in which a tray is positioned between said framework and said upper run of endless belt.

10. In a freezing tunnel, means for conveying articles to be frozen through the tunnel, means for contacting the articles to be frozen with cryogenic liquid, said conveying means having an upper run and a lower run each at least partially housed in said tunnel, support means in said tunnel for the lower run of said conveying means, said support means being partially hollow and having a plurality of outlets to distribute cleaning fluid to the interior surfaces of said tunnel, said support means having an inlet connection through which the cleaning fluid is supplied.

11. In a freezing tunnel, means for conveying articles to be frozen through said tunnel, support means in said tunnel for said conveying means, said support means being partially hollow and having a plurality of outlets to distribute cleaning fluid in said tunnel, said support means comprising at least one tubular framework, said conveying means comprising an endless belt at least partially housed in said tunnel, said tubular framework at least partially supporting the upper run of said endless belt, said outlets in said framework at least partially directed toward the lower run of said belt, a second tubular framework at least partially supporting the lower run of said belt, said second tubular framework being adjustably positioned in said tunnel.

References Cited

UNITED STATES PATENTS

| | | | |
|---|---|---|---|
| Re. 14,007 | 11/1915 | Couch | 16—60 XR |
| 1,235,027 | 7/1917 | Harrison | 134—131 XR |
| 1,608,591 | 11/1926 | Frink | 134—152 |
| 1,617,096 | 2/1927 | Bell et al. | 134—131 XR |
| 1,737,938 | 12/1929 | Miller | 134—151 XR |
| 2,940,458 | 6/1960 | Speckman | 134—104 XR |
| 3,298,188 | 1/1967 | Webster et al. | 62—63 |
| 3,320,964 | 5/1967 | Tripp | 62—303 XR |
| 3,402,568 | 9/1968 | Kamin et al. | 62—63 XR |

FOREIGN PATENTS

| | | |
|---|---|---|
| 513,599 | 2/1921 | France. |
| 616,324 | 1/1927 | France. |

WILLIAM E. WAYNER, Primary Examiner

U.S. Cl. X.R.

62—380; 134—104, 131; 198—229